United States Patent [19]

Halligan

[11] Patent Number: 5,436,964
[45] Date of Patent: Jul. 25, 1995

[54] PROGRAMMABLE CALL PROGRESS TONES FOR A SWITCHING SYSTEM

[75] Inventor: Janice C. Halligan, Ottawa, Canada

[73] Assignee: Mitel Corporation, Kanata, Canada

[21] Appl. No.: 50,900

[22] Filed: Apr. 21, 1993

[30] Foreign Application Priority Data

May 7, 1992 [CA] Canada .................................. 2068154

[51] Int. Cl.$^6$ ............................................. H04M 3/00
[52] U.S. Cl. .................................. 379/257; 370/110.2; 370/110.1; 370/85.1; 379/418
[58] Field of Search .................... 379/257, 418, 67; 370/110.1, 67, 58, 85, 110.3, 110.2, 85.1

[56] References Cited

U.S. PATENT DOCUMENTS

| | | | |
|---|---|---|---|
| 4,616,360 | 10/1986 | Lewis | 370/67 |
| 5,127,004 | 6/1992 | Lenihan et al. | 379/418 |
| 5,140,590 | 8/1992 | Gertsman et al. | 370/110.1 |

Primary Examiner—James L. Dwyer
Assistant Examiner—Scott Wolinsky
Attorney, Agent, or Firm—Laff, Whitesel, Conte & Saret, Ltd.

[57] ABSTRACT

In accordance with an embodiment of the invention, a method of establishing call progress tones for a switching system having a generic signal generating apparatus, comprising the steps of displaying at least one form on a display and inserting into fields of the form definitions of the cadencing and particular generic signals associated with each call progress tone for a tone plan, temporarily storing the definitions in a memory, compiling the definitions as control signals into object code, storing the object code in a random access memory, and using the object code in the processing of a call by a switching system processor to control provision of particular signals from the generic signal generating apparatus with a particular cadence and signal level to a subscriber or operator.

4 Claims, 1 Drawing Sheet

PROGRAMMABLE CALL PROGRESS TONES FOR A SWITCHING SYSTEM

FIELD OF THE INVENTION

This invention relates to telephone switching systems and in particular to a method of establishing call progress tones for such systems.

BACKGROUND TO THE INVENTION

Call progress tones provide an indication to telephone users of the progress and result of a call being initiated or in process. Different frequencies, various levels, and patterns of tones indicate different conditions, such as whether a dialed number is busy or is out of service, or that a dialed device is being rung. There are many variations of the composition and cadencing pattern of tones involved in call progress indication between geographic regions.

A set of call progress tones which is used for a particular country or geographic location is referred to as a plan. Call progress tone plans have been created by the switching system manufacturer, and are provided with the switching system. In some cases the hardware supplied for the tone generation is unique for each unique region. In other cases it forms part of the software used by the switching system processor, and therefore a full switching system software load is required to be provided to implement a call progress tone plan for a particular geographic region. This requires the switching system to be out of service for the interval of the load, and errors can be introduced during the full software load.

In order to alleviate this problem, for signalling, in one prior art system every possible signal generation software module was provided by the manufacturer to implement a signalling plan, and particular ones to be used were chosen by the telephone company customer and implemented, at the unique location. This has been described in the patent application entitled "Telephone or Data Switching With Variable Protocol Inter-Office Communication", U.S. Ser. No. 494,668, filed Mar. 16th, 1990, and assigned to Mitel Corporation. In that invention object code sub-modules which generate the tone signals to change the inter-office protocol for the system for every possible tone is supplied to the final unique site, in order that the tone plan could be defined on-site from the library of sub-modules.

Call progress tone generators can use the sub-modules to provide some of the tones. However, in order to provide all the variable call progress tones for a switching office, I have found that the provision of sub-modules which provide all possible tone plans only one of which is selected at a given site for the generation of a particular tone plan, is slow and wasteful of resources. Yet it is costly and inefficient to rebuild a complete switching system software load for each unique region, and also very costly to deliver different hardware for the tone generator portion of the systems for each unique region.

SUMMARY OF THE PRESENT INVENTION

In accordance with the present invention, a system is provided in which the forms of call progress tones can be defined at the unique regional site in which the switching system is installed, and only those unique definitions are compiled into object code by the processor of the switching system. The tone definition object code for only those particular call progress tones to be used within the unique region are stored. Accordingly it is not necessary to provide a unique complete software load for the switching system, nor different hardware for the tone generator portions of the systems for each region, nor is it necessary to locally store software modules for every possible call progress tone for every region in which the switching system might be sold, in case the switching system is shipped to or moved to a particular unique region.

The result is high efficiency in memory utilization, speed in processing control codes for the establishment of call progress tones, and flexibility for the system purchaser to define exactly the particular requirements of that installation, without requiring referral back to the manufacturer. These benefits result in reduced overall costs for the purchaser of the system.

A typical switching system that could utilize the invention is Model SX2000S, sold by Mitel Corporation.

In accordance with an embodiment of the invention, a method of establishing call progress tones for a switching system having a generic signal generating apparatus, comprising the steps of displaying at least one form on a display and inserting into fields of the form definitions of the cadencing and particular generic signals associated with each call progress tone for a tone plan, temporarily storing the definitions in a memory, compiling the definitions as control signals into object code, storing the object code in a random access memory, and using the object code in the processing of a call by a switching system processor to control provision of particular signals from the generic signal generating apparatus with a particular cadence and signal level to a subscriber or operator.

BRIEF INTRODUCTIONS TO THE DRAWINGS

A better understanding of the invention will be obtained by reference to the detailed description below, in conjunction with the following drawing, in which:

FIG. 1 is a block diagram of a system for implementing the invention.

DETAILED DESCRIPTION OF THE INVENTION

Figure 1:
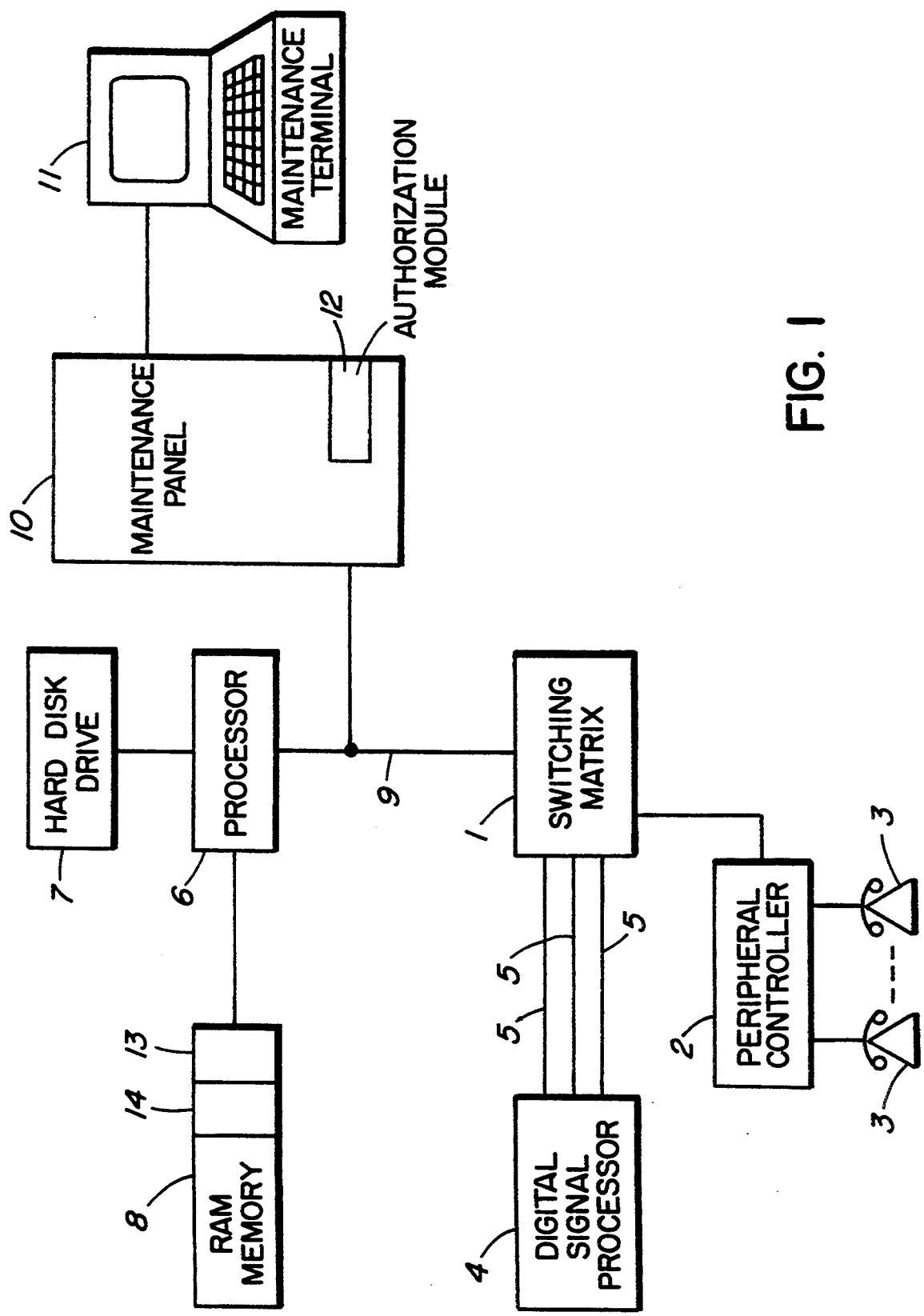

FIG. 1 illustrates a representative system in which the invention can be implemented. A switching matrix 1, such as the circuit switch matrix described in U.S. Pat. No. 4,616,360 issued Oct. 7th, 1986 is connected to at least one peripheral controller 2, to which plural peripherals such as telephone sets 3, or trunks, etc. are connected. A digital signal processor 4 such as type TMS32010 with ancillary memories, etc. is connected to the switching matrix 1 for supplying various tones via channels 5 to the switching matrix for application to telephone sets 3. Operation of the system, particularly the switching matrix 1 is controlled by processor 6 such as type 68020. The controlling software for the processor 6 is stored on a hard disk drive 7 and random access (RAM) memory 8, as in the aforenoted SX2000S.

Typically the processor 6 is connected to the switching matrix 1 by means of a main bus 9. The circuitry of a maintenance panel 10 is also connected to the main bus 9, and a maintenance terminal 11 is also connected to the maintenance panel 10.

A security authorization module 12 (e.g. containing system identification) is often plugged into the maintenance panel, which is provided by the manufacturer to allow loading of the operation software to the hard disk 7 and/or into RAM memory 8, and thus operation of the system. Usually the authorization module allows operation of the system with certain features which have been purchased from the manufacturer.

In accordance with an embodiment of the invention, the programmed characteristics of the tone plan are stored in a portion 13 of the random access memory. These characteristics are made accessible to the maintenance personnel for viewing on the maintenance terminal 11. Another portion 14 of the RAM memory contains cadencing and signal channel data which specifies which of the signal channels 5 from the digital processor 4 are to be used.

Stored on the hard disk drive is a compiler as well as a human machine interface (HMI) table generator created with a development tool such as DEV-GUIDE ™, available from Sun Microsystems.

The invention operates as follows, typically by a maintenance person. Firstly, the system is powered up using the full normal system load stored on the hard disk drive 7. The program is loaded into the memory 8.

The authorization module 12 is then removed from the maintenance panel and a tone definition authorization module is plugged in its place. The modules could be hardware, firmware, or software codes.

By use of the maintenance terminal, and the normal operation software, the switching matrix 1 is partitioned so that telephone sets 3 cannot cause the processor 6 to respond to requests for service. The maintenance terminal 11 is operated to enter tone delete and/or ring delete commands to delete any unnecessary data from the hard disk drive.

Assuming that a ring code as well as a call progress tone plan is to be entered, all of which are considered herein to be defined as call progress tones, a ring code assignment display and a ring plan version assignment display are retrieved from the hard disk drive 7 and displayed on the maintenance terminal 11 under control of processor 6. Table 1, below, illustrates a representative ringing assignment form with the data under the column R1, E1 and Reminder columns, entered by the maintenance person.

TABLE 1
RINGING ASSIGNMENT

| Ring Codes: Step | State | R1 Duration (ms) | E1 | Reminder |
|---|---|---|---|---|
| 1 | ON | 2000 | 500 | 500 |
| 2 | OFF | 4000 | 500 | |
| 3 | ON | | 500 | |
| 4 | OFF | | 500 | |
| 5 | ON | | 500 | |
| 6 | OFF | | 3500 | |

Tones and ringing assignment display, with representative entries to the right of the colons is shown as Table 2, below:

TABLE 2
TONES/RINGING MISCELLANEOUS ASSIGNMENT

| Version Names | |
|---|---|
| Tone Plan | TONEPLAN |
| Ringing Plan | CADENCE |
| Companding Law (A/U) | U |
| DTMF Tones | |
| Required ? (yes/no) | yes |
| Generated Level (3 to 30 −dBm) | 5 |

TABLE 2-continued
TONES/RINGING MISCELLANEOUS ASSIGNMENT

| MF-R1 Tones | |
|---|---|
| Required ? (yes/no) | yes |
| Generated Level (3 to 30 −dBm) | 7 |

The ring plan data in related source code is then stored on the hard disk drive 7, and displays for each tone in the tone plan can be brought from the hard disk drive 7 onto the maintenance terminal 11 display. Examples of call progress tones to be assigned are dial, recall dial, feature active dial, confirmation, busy, reorder (congestion), call waiting, emergency call waiting, special busy, R1 audible ringing, E1 audible ringing, etc. Examples of displays, and entry into each column are shown as Tables 3-13.

TABLE 3
CALL PROGRESS TONE ASSIGNMENT
Tone Name: Dial

| Step | Tone ID | Duration (ms) | Repeat From | Repetitions |
|---|---|---|---|---|
| 1 | 3 | | | |

TABLE 4
CALL PROGRESS TONE ASSIGNMENT
Tone Name: Recall Dial

| Step | Tone ID | Duration (ms) | Repeat From | Repetitions |
|---|---|---|---|---|
| 1 | 2 | 100 | | |
| 2 | silence | 100 | 1 | 3 |
| 3 | 2 | | | |

TABLE 5
CALL PROGRESS TONE ASSIGNMENT
Tone Name: Feature Active Dial

| Step | Tone ID | Duration (ms) | Repeat From | Repetitions |
|---|---|---|---|---|
| 1 | 2 | 100 | | |
| 2 | silence | 100 | 1 | 8 |
| 3 | 2 | | | |

TABLE 6
CALL PROGRESS TONE ASSIGNMENT
Tone Name: Confirmation

| Step | Tone ID | Duration (ms) | Repeat From | Repetitions |
|---|---|---|---|---|
| 1 | 2 | 100 | | |
| 2 | silence | 100 | 1 | 3 |
| 3 | silence | | | |

TABLE 7
CALL PROGRESS TONE ASSIGNMENT
Tone Name: Busy

| Step | Tone ID | Duration (ms) | Repeat From | Repetitions |
|---|---|---|---|---|
| 1 | 1 | 500 | | |
| 2 | silence | 500 | 1 | infinite |

TABLE 8
CALL PROGRESS TONE ASSIGNMENT
Tone Name: Reorder (Congestion)

| Step | Tone ID | Duration (ms) | Repeat From | Repetitions |
|---|---|---|---|---|
| 1 | 1 | 250 | | |
| 2 | silence | 250 | 1 | infinite |

TABLE 9

CALL PROGRESS TONE ASSIGNMENT

Tone Name: Call Waiting

| Step | Tone ID | Duration (ms) | Repeat From | Repetitions |
|---|---|---|---|---|
| 1 | resume speech | 1000 | | |
| 2 | 4 | 300 | | |
| 3 | resume speech | 9700 | 2 | 2 |
| 4 | resume speech | | | |

TABLE 10

CALL PROGRESS TONE ASSIGNMENT

Tone Name: Emergency Call Waiting

| Step | Tone ID | Duration (ms) | Repeat From | Repetitions |
|---|---|---|---|---|
| 1 | 3 | 500 | | |
| 2 | resume speech | 2500 | 1 | infinite |

TABLE 11

CALL PROGRESS TONE ASSIGNMENT

Tone Name: Special Busy

| Step | Tone ID | Duration (ms) | Repeat From | Repetitions |
|---|---|---|---|---|
| 1 | 2 | 500 | | |
| 2 | silence | 500 | 1 | infinite |

TABLE 12

CALL PROGRESS TONE ASSIGNMENT

Tone Name: R1 Audible Ringing

| Step | Tone ID | Duration (ms) | Repeat From | Repetitions |
|---|---|---|---|---|
| 1 | 3 | 1000 | | |
| 2 | silence | 4000 | 1 | infinite |

TABLE 13

CALL PROGRESS TONE ASSIGNMENT

Tone Name: E1 Audible Ringing

| Step | Tone ID | Duration (ms) | Repeat From | Repetitions |
|---|---|---|---|---|
| 1 | 3 | 500 | | |
| 2 | silence | 500 | | |
| 3 | 3 | 500 | | |
| 4 | silence | 500 | | |
| 5 | 3 | 500 | | |
| 6 | silence | 500 | 1 | infinite |

It will be noted that the tone assignments refer to tone identification (ID). These are assigned using a tone definition display, which is brought onto the maintenance terminal 11 display and filled in by the maintenance person, shown below as Table 14.

TABLE 14

TONE DEFINITION

| Tone ID | Freq1 (Hz) | Freq2 (Hz) | Level (−dBm) | Alarm |
|---|---|---|---|---|
| 1 | 480 | 620 | 24 | yes |
| 2 | 350 | 440 | 13 | yes |
| 3 | 440 | 480 | 19 | yes |
| 4 | 440 | | 13 | yes |
| 5 | 480 | | 17 | yes |
| 6 | 1400 | 2450 | 3 | yes |
| 7 | 2025 | | 17 | yes |

It will also be noted that each tone is given an ID number, one or multiple frequencies and a power level, as well as an indication of whether an alarm should be given in case of a fault. Each of those tones is available from the digital signal processor 4 by means of one of the channels 5.

Thus it may be seen that in any of the tone assignments there are a sequence of steps which define the tone identification (which identify the frequencies of the tones used and the power levels) and the duration, the sequence of steps defined in the cadence.

The data stored in each of the display forms is also stored on the hard disk 7.

The processor 6 is then commanded from the maintenance terminal to operate the compiler to compile the source code data entered from the maintenance terminal 11 into object code. Once compiled, the processor 6 is commanded from the maintenance terminal to copy the object code onto hard disk 7, onto a floppy disk (not shown) for backup, and into memory 8, with the cadencing and signalling channel data into memory portion 14, and the programmed characteristics of the tone plan, which can be accessed by the maintenance terminal 11, in portion 13 of memory 8.

Upon system initialization, the new codes are loaded from the hard drive into RAM 8 in the usual fashion and tested and/or then used for call processing.

The result is that during operation of the system the hard disk has similar content as would be the case in a system which does not contain this invention, (plus the compiler code) and a RAM memory which maintains progress tone controlling data restricted only to the very specific progress tones used in this system, which can be accessed rapidly and readily by processor 6.

Preferably the system is then tested using the tone plan data stored in memory 8. Once the test has been successfully completed, the tone definition authorization module is removed from maintenance panel 10 and is replaced by the original authorization module. The system is then unpartitioned, allowing the peripherals to use the system.

Assuming that a telephone set 3 goes off hook, the processor accesses RAM memory 8 for dial tone control data. The processor accesses the call process tone assignment for dial tone, shown in Table 3. It may be seen that there is a single step calling for dial tone ID 2. Dial tone ID 2 is shown in Table 14 as being composed of both a 350 Hz and 440 Hz tone at a level of −13 dBm. Since there is only a single step, this tone has no cadence, i.e. is continuous.

The processor, receiving the tone ID 2 indication, cycles through the steps (in this case 1), causing the channels which provide tone ID 2 from digital signal processor 4 to be applied to the channel in the switching matrix and peripheral controller 2 to telephone set 3 to be applied to that line.

Hearing the dial tone, the user at telephone set 3 then proceeds with the remaining steps required to proceed with the call, such as dialing the dialed number.

In case the particular tone assignment has several steps, processor 6 proceeds through each of the steps, noting the duration in milliseconds required for each step. Thus for example if, as shown in the recall dial Table 4, that there is the application of tone ID 2 for 100 milliseconds, followed by 100 milliseconds of silence, followed by an indefinite application of tone ID 2, processor 6 controls the switching of the channels 5 of tone ID 2 through switching matrix 1 to telephone set 3 for the appropriate intervals, interrupting the connection for the silent intervals. In this manner processor 6, under control of the data stored in portion 14 of memory 8, controls the cadence of the various tones. In case the particular tone plan is to be checked, the data stored in portion 13 of memory 8 may be requested to be displaced on maintenance terminal 11. During a maintenance interval the entire process may be repeated, in order to change the call process tones which are implemented. Thus the storage of the call progress tone definitions in portion 13 of memory 8 allows checking at any later date of what tone plan is currently implemented in the system.

Preferably the data stored in portion 14 of memory 8 is comprised of a signal lookup table and a cadence table, as described above. There is an entry into the signal lookup table for each call progress tone. For simple tones, the data stored therein consists of the channel and link 5 on which the appropriate pure tone is generated. For cadenced tones, the data is comprised of an index into the cadence table.

The cadence table preferably consists of records, one record each being used for each call progress tone.

The tone plan version assignment preferably is comprised of six fields: name, companding type ($\mu$) or a, DTMF tones included, DTMF tones level, MFR 1 tones included and MFR 1 tones level. There is only one instance of this record, which is used to allow the user to indicate the type of companding (a-law or $\mu$-law) to be used for the tone plan. This is shown as Table 2. Other information specified in this table is the availability of DTMF-tone generation, the level required of these and the name to be used for this plan, for identification purposes.

The data stored to define generated tones, is preferably as shown in the Table 14 is tone ID, frequency 1, frequency 2, level and whether an alarm should be used on failure. In one successful embodiment of the invention there were thirty-one instances of this data.

A person understanding this invention may now conceive of alternative structures and embodiments or variations of the above. All of those which fall within the scope of the claims appended hereto are considered to be part of the present invention.

I claim:

1. A method of establishing call progress tones for a switching system having generic signal generating means comprising the steps of:
   (a) displaying at least one form on a display and inserting into fields of the form definitions of cadencing and particular generic signals associated with each call progress tone for a tone plan,
   (b) temporarily storing the definitions in a memory,
   (c) compiling the definitions as control signals into object code,
   (d) storing the object code in a random access memory, and
   (e) using the object code in the processing of a call by a switching system processor to control provision of particular signals from the generic signal generating means with defined particular cadence and signal level to a subscriber or operator.

2. A method as defined in claim 1 in which the generic signal generating means is a digital signal processor for providing various signal frequencies and levels in different output channels, and in which the definition of particular signal frequencies to be used for a particular type of call progress tone is a definition of which of said output channels to use.

3. A method as defined in claim 2 in which the definitions of cadence and signal frequency are stored in one portion of the memory, and in which the definition of which cadencing and particular signal frequencies are to be used for a particular type of call progress tone is stored in a second portion of the memory.

4. A method as defined in claim 3, in which the switching system is comprised of a first system identification module, including the further step of removing said first module prior to said displaying step and replacing it with a second tone definition authorization module, and following the object code storing step, removing said second module and replacing it with said first module, then operating the switching system using said first module and said object code.

* * * * *